United States Patent
Doumet

[19]

[11] Patent Number: 5,820,814
[45] Date of Patent: Oct. 13, 1998

[54] METHOD AND APPARATUS FOR COOLING AND SOLIDIFYING RED-HOT MOLTEN BLAST FURNACE SLAG

[76] Inventor: Joseph Elias Doumet, 90-681 Jdeideh El-Metn, Lebanon

[21] Appl. No.: 653,389

[22] Filed: May 24, 1996

[30] Foreign Application Priority Data

Jun. 20, 1995 [DE] Germany .................. 195 22 320.9

[51] Int. Cl.⁶ ............................................. C21B 3/06
[52] U.S. Cl. ............................................. 266/44; 266/201
[58] Field of Search ............................ 266/201, 200, 266/156, 44; 65/19, 20, 141

[56] References Cited

U.S. PATENT DOCUMENTS 5,255,900  10/1993  Schott ................................. 266/201

FOREIGN PATENT DOCUMENTS 402126005  5/1990  Japan .................................. 266/201

0614064  7/1978  Russian Federation ............ 266/201

OTHER PUBLICATIONS

Patent Abstracts of Japan, vol. 5, No. 156 Fujiura, Oct. 6, 1981.

*Primary Examiner*—Scott Kastler
*Attorney, Agent, or Firm*—Reising, Ethington, Learman & McCulloch, PLLC

[57] ABSTRACT

The invention relates to the cooling of red-hot molten blast furnace slag. In this case in order that a substantial proportion of the heat content of the red-hot molten blast furnace slag can be recovered this is introduced together with coal or fuel containing substantially coal into a reactor in which the blast furnace slag is cooled by utilising the heat content of this slag and with the aid of supplied steam to gasify the coal to form a fuel gas, particularly water gas or blue gas containing CO and $H_2$, which is drawn off separately from the cooled quantity of solids.

33 Claims, 2 Drawing Sheets

METHOD AND APPARATUS FOR COOLING AND SOLIDIFYING RED-HOT MOLTEN BLAST FURNACE SLAG

The invention relates to a method for cooling and solidifying red-hot blast furnace slag, wherein such slag as well as a fuel and vapour are delivered to a reactor and wherein a fuel gas is produced in the reactor utilising the heat content of the blast furnace slag. The invention also relates to apparatus for carrying out this method.

BACKGROUND OF THE INVENTION

During operation of a blast furnace, particularly in the production of pig iron, slag is precipitated in the red-hot molten state at the slag spout. It is known in the art for this red-hot molten blast furnace slag to be cooled or quenched immediately thereafter. Various methods and devices or apparatus are known for this purpose. For instance the blast furnace slag can be allowed to flow off for example after the slag notch directly into a moving water bath or the blast furnace slag which is flowing off can be sprayed with water in order in this way to to produce somewhat vitreous grains in the form of slag sand or so-called granulated blast furnace slag. It is also known in the art to allow the red-hot molten blast furnace slag to cool in the form of blocks which are then used for the production of concrete additives. These known methods and apparatus have the significant disadvantage that the heat content of the red-hot molten blast furnace slag is completely lost.

Therefore it has already been proposed (cf. JP 56-88 494 A/1981, according to Patent Abstracts of Japan, Sect. C, Vol. 5, No. 156) for red-hot molten blast furnace slag to be cooled by introducing it into a trough-like first reactor (reaction tank) in which—in the region below a hood—coke from a container and, by way of a type of jet lance, vapour are introduced into the red-hot molten slag in order by utilising the sensible heat of the slag to produce a fuel gas which is extracted from this reactor in the region of the said hood. The molten slag which is still red-hot flows off out of this trough-like first reactor and is guided over the periphery of a rotary drum and cooled and solidified. This solidified material is then passed into a shaft-like second reactor, about half-way up the height thereof, which has a plurality of fluidised bed chambers disposed one above the other over its tapered upper end. Coke powder is fed to the first chamber in order to produce water gas with the aid of a hot gas which contains water vapour and rises through the chambers and which has previously—below the said chambers—flowed through the solidified slag material. Thus with this known method, in order to recover at least a proportion of the heat content of the red-hot molten slag which is delivered it is necessary to have a total apparatus or installation with two different reactors as well as a cooling and solidifying drum disposed therebetween and also a series of arrangements for delivering and discharging the various products for each reactor.

The object of the invention therefore is to provide a method and apparatus by means of which a significant proportion of the heat content of the red-hot molten blast furnace slag can be recovered.

SUMMARY OF THE INVENTION

In the method according to the invention the red-hot molten blast furnace slag is fed together with a measured controllable proportion of the fuel which contains at least some coal to an upright approximately shaft-like reactor in which a material column consisting of the mixture of blast furnace slag and fuel is established and maintained with a predetermined filling height or level. While this material column travels downwards in the reactor the delivered coal is gasified by utilising the heat content of the blast furnace slag to form a fuel gas or heating gas containing essentially hydrogen ($H_2$) and carbon monoxide (CO)—in an endothermic reaction—and the red-hot molten blast furnace slag is cooled and solidified. Thus as a result a rapid cooling or quenching and solidification of the blast furnace slag takes place and a considerable proportion of the heat content of this slag is recovered whilst at the same time a fuel gas is produced which—as will be mentioned below—can be usefully employed for various purposes.

The blast furnace slag solidified in this way is then drawn off together with the coal ash (fuel ash) produced in the gasification, whilst the fuel gas produced is led off separately and collected. Depending upon the purpose for which it is to be used, this fuel gas can be delivered directly to the combustion location.

This cooling of the red-hot molten blast furnace slag with simultaneous gasification of coal or coal-containing fuel and recovery of heat from the slag can be carried out continuously in the reactor.

By means of this gasification a fuel gas or heating gas is produced for instance in the form of water gas or blue gas. This water gas is produced in the gasification of the coal for instance by the following reaction:

$$C + H_2O \rightarrow C + H_2 - 120.7 \text{ J}$$

Pre-crushed so called cheap coal, having a relatively low calorific value, much as high-ash and highly-volatile coal and/or brown coal, is advantageously added to the red-hot molten blast furnace slag and gasified by the injection of steam.

In this case it is also possible to add liquid fuels, particularly heavy liquid fuels such as heavy oil, so that a fuel mixture is produced which contains coal and liquid fuels. Thus, although coal with dramatically differing or fluctuating proportions of hydrocarbon is preferred, at least a corresponding proportion of heavy oil or similar liquid fuel with a higher proportion of hydrocarbon than coal can also be used as well. This then results essentially in the following principal reaction equation:

$$C_xH_y + x*H_2O \rightarrow x*CO + (x+y/2)*H_2 - Q$$

This means:

$$CH_4 * H_2O \rightarrow CO + 3*H_2 - 193 \text{ J/mol}$$

The coal to be used can preferably be one which is pre-crushed to a grain size of approximately 5 to 10 mm; in this case it does not necessarily need to be dried.

According to the invention it is also advantageous if the coal or the fuel mixture containing various coals and optionally liquid fuels is added to the blast furnace slag in such a proportion by weight that during the gasification in the reactor the slag is cooled to a temperature of approximately 900° C. by utilising or depending upon its enthalpy as well as by the injection of steam. In this case the blast furnace slag is preferably delivered directly from the slag spout of a blast furnace with a temperature of approximately 1400° to 1500° C.

If in this method according to the invention the mixture of blast furnace slag and coal (fuel) travels downwards within the reactor approximately in the form of a column, then during cooling of the slag and simultaneous gasification of the coal or the fuel there are essentially three phases which occur, namely a pyrolysis of the coal which occurs essentially in the upper portion of the reactor, a solidification of the delivered blast furnace slag, particularly in the lower half of the reactor, and the production of fuel gas or water gas or blue gas, this gas production taking place practically over the entire filling height of the reactor, i.e. both in the liquid phase and in the solidification or solid phase of the slag. Because of the fuel gas production and the injection of steam, during this cooling of the blast furnace slag a solidification of this slag takes place approximately in granular or sand form.

In order to allow the various reactions to progress reliably in the reactor or to be able to control them it is advantageous to set and maintain a minimum filling ratio of the slag/coal mixture (including the steam) in the reactor. For this purpose it is proposed that at the lower solids outlet of the reactor at least the solidified blast furnace slag (but overall advantageously the entire mixture of solidified blast furnace slag and ash) be crushed—in so far as this is necessary—into a type of granulated slag and that the quantity of solids discharged, leaving the reactor preferably at the lower solids outlet, be controlled as a function of the filling level. For this purpose in practice for example a controllable outlet arrangement and/or a controllable crushing arrangement can be connected together with a filling level monitoring device for control purposes in such a way that a predetermined or necessary filling level can always be maintained within the reactor.

Furthermore, it is considered particularly advantageous if at the common reactor inlet for the red-hot molten blast furnace slag and the coal a zero pressure is set and maintained, which is controlled by controlling the quantity of fuel gas drawn off to a gas collecting tank. In this way outside air can be largely or completely prevented from entering the interior of the reactor and mixing with the produced fuel gas. In this connection it may also be envisaged that at the upper reactor inlet a slight flow of steam is produced and maintained which compensates for the slight pressure changes in the region of the reactor inlet. For this a small quantity of steam could be drawn off or partially absorbed or also some could be introduced into the reactor in order to prevent any entry of external air.

In the method according to the invention it is also advantageous if before the fuel gas extracted from the reactor is introduced into the gas collecting tank it is first of all passed through a heat exchanger for the production of saturated steam and thereby cooled to a suitable or usable temperature. For this purpose demineralised water is passed through the heat exchanger for generating the steam. The saturated steam thus generated is then first of all passed through double walls or a double-walled casing of the reactor housing and thereby at least partially superheated so that then—after leaving the double walls—for the gas production it is injected in the lowest reactor zone into the slag-coal mixture and distributed over the cross-section in the form of at least partially superheated steam. This steam is required as a supplement to the water which enters the reactor as moisture in the coal. The blast furnace slag located in the lower part of the reactor also ensures a further superheating of the injected steam and thus an acceleration of the reaction with the carbon in the coal or in the fuel mixture.

It is also particularly convenient and advantageous to heat or preheat the demineralised water before the steam generation by passing it through mechanical arrangements which are provided on the lower part of the reactor and require cooling (for example crushing rolls, bucket wheel or other apparatus parts coming into contact with the hot solid material).

It will also be considered advantageous for the slag/ash mixture crushed into grain or sand form and extracted from the reactor at the lower solids outlet to be cooled further by spraying on of water and then to be delivered to a storage place or storage area. Thus it is possible for the slag/ash mixture extracted from the reactor to be cooled to a favourable final temperature.

Thus the blast furnace slag cooled according to the invention is solidified into a granular or sand form as granulated blast furnace slag, and at the same time fuel gas is produced which is particularly useful in economic terms, particularly in the form of water gas or blue gas. This fuel gas can be used particularly advantageously as reducing fuel gas or heating gas in a blast furnace or returned directly to the blast furnace or also used in some other way. A preferred possible use for the granulated blast furnace slag thus produced is to use it for the production of blast furnace cement. This granulated blast furnace slag produced according to the invention has a particularly favourable hydraulic behaviour, which in particular is better than that of granulated blast furnace slag which has merely been cooled in the conventional manner by water cooling. The coal ash from the gasification of the coal which is mixed with the granulated blast furnace slag forms a useful filler in the slag. Thus, to summarise, by means of this method according to the invention a granulated blast furnace slag can be produced which is very useful—particularly for cement production—and simultaneously—using cheap coal or waste coal or brown coal—a valuable fuel gas can be produced which above all can be injected into a blast furnace as a highly-reducing agent for iron oxide and simultaneously a quite considerable proportion of the heat content of the red-hot molten blast furnace slag can be recovered.

Further details of the invention are revealed by the following description of an embodiment of apparatus according to the invention for cooling red-hot molten blast furnace slag.

DETAILED DESCRIPTION

Figure 1:
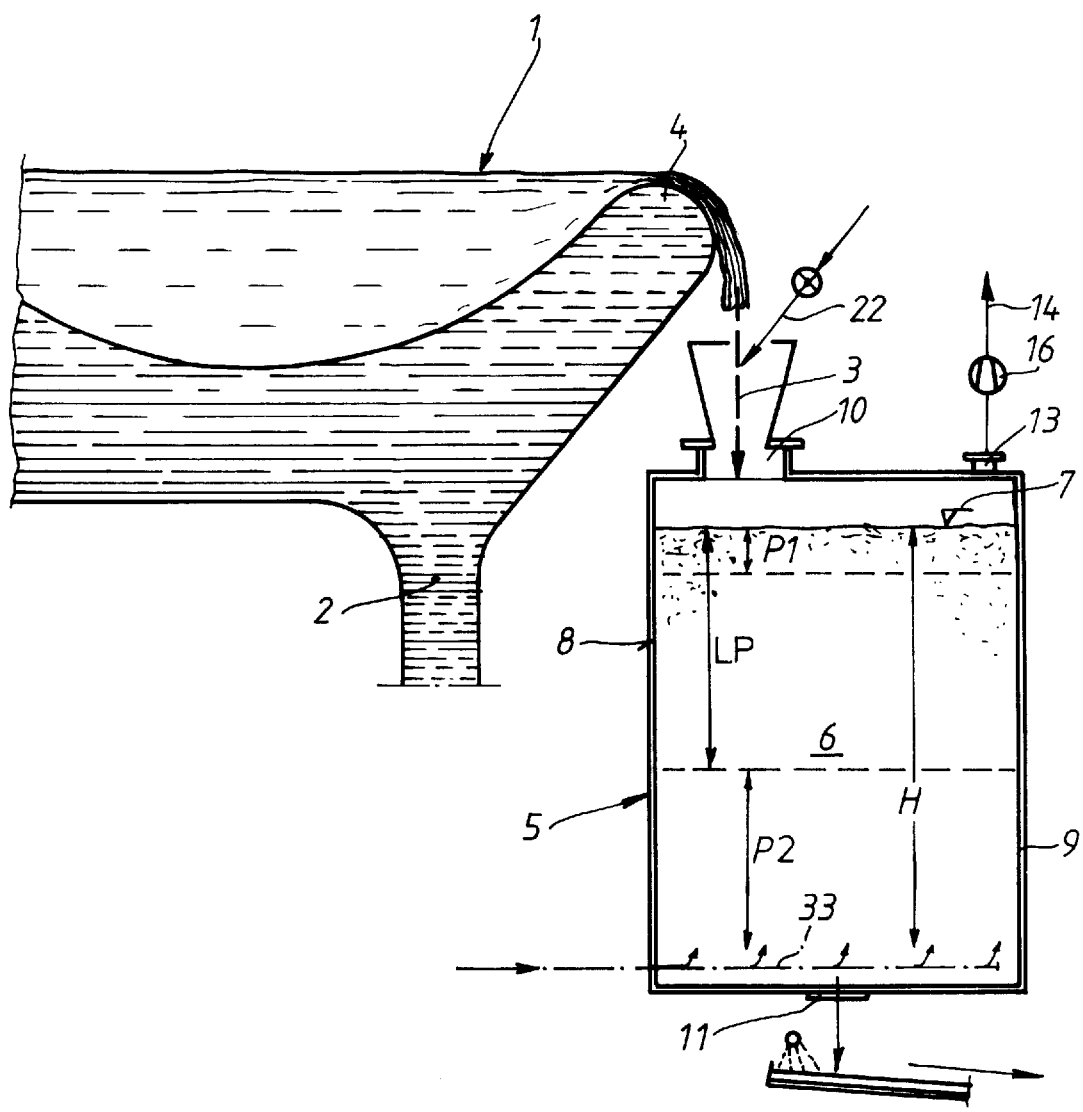
FIG. 1 shows a greatly simplified diagram of the apparatus according to the invention.

The general construction of the apparatus which is adapted for carrying out the method according to the invention as described above will first of all be described with the aid of FIG. 1. In this it may be assumed that the cooling device according to the invention is disposed in the region below the spout, which is only indicated at 1, of a blast furnace. According to this pig iron is extracted at 2, whilst red-hot molten blast furnace slag is drawn off according to the broken arrow 3 by way of a type of slag protection 4.

A substantial part of the cooling device according to the invention is formed by an approximately shaft-shaped reactor 5, which is constructed to receive a controllable filling of red-hot molten blast furnace slag and coal or a fuel mixture containing at least coal as well as to generate a fuel gas from this coal (fuel mixture) utilising the heat content or the enthalpy of the blast furnace slag, as is explained in somewhat greater detail below with the aid of FIG. 2.

Thus in the interior of this reactor 5 a type of material column 6 consisting of a slag/coal mixture is set and maintained with a predetermined filling height or level 7. As has already been explained above, during the cooling of the slag and the simultaneous gasification of the coal or the fuel within the reactor 5 there are essentially three phases which are distributed over the entire height H of the material column 6, approximately as indicated in FIG. 1, namely an upper phase P1 of pyrolysis of the coal, also a phase P2 of solidification of the delivered blast furnace slag, this taking place in particular in the lower half of the reactor 5, and the generation of fuel gas or water gas which occurs practically over the entire filling height, i.e. approximately over the entire height H of the material column 6, the delivered blast furnace slag being in a liquid phase LP in the region between the filling height 7 and approximately the beginning of the solidification or solid material phase. During this cooling of the blast furnace slag, solidification takes place into a granular or sand form.

This reactor comprises a substantially closed housing 8 with double walls 9 which are capable of being cooled. For the delivery of blast furnace slag (arrow 3) and coal or fuel (arrow 22) a common reactor inlet 10 is provided at the upper end, whilst at the lower end of the reactor 5 a solids outlet 11 is provided for common removal of solidified blast furnace slag and coal ash. Also located at the upper end of the reactor 5 is a gas outlet 13 for drawing off generated fuel gas according to the arrow 14, which can preferably be drawn off separately from the slag with the aid of an extractor and conveyor fan 16. The reactor inlet 10, the solids outlet 11 and the gas outlet 13 are advantageously cooled jointly with the double walls 9.

In the reactor 5 the delivered blast furnace slag is cooled by utilising its heat content and by the supply of steam—by way of a nozzle arrangement 33—injected into the material column and uniformly distributed in the lower part of the reactor 5, so that this material column has superheated steam flowing through it from the bottom upwards for gasification of the fuel.

Figure 2:
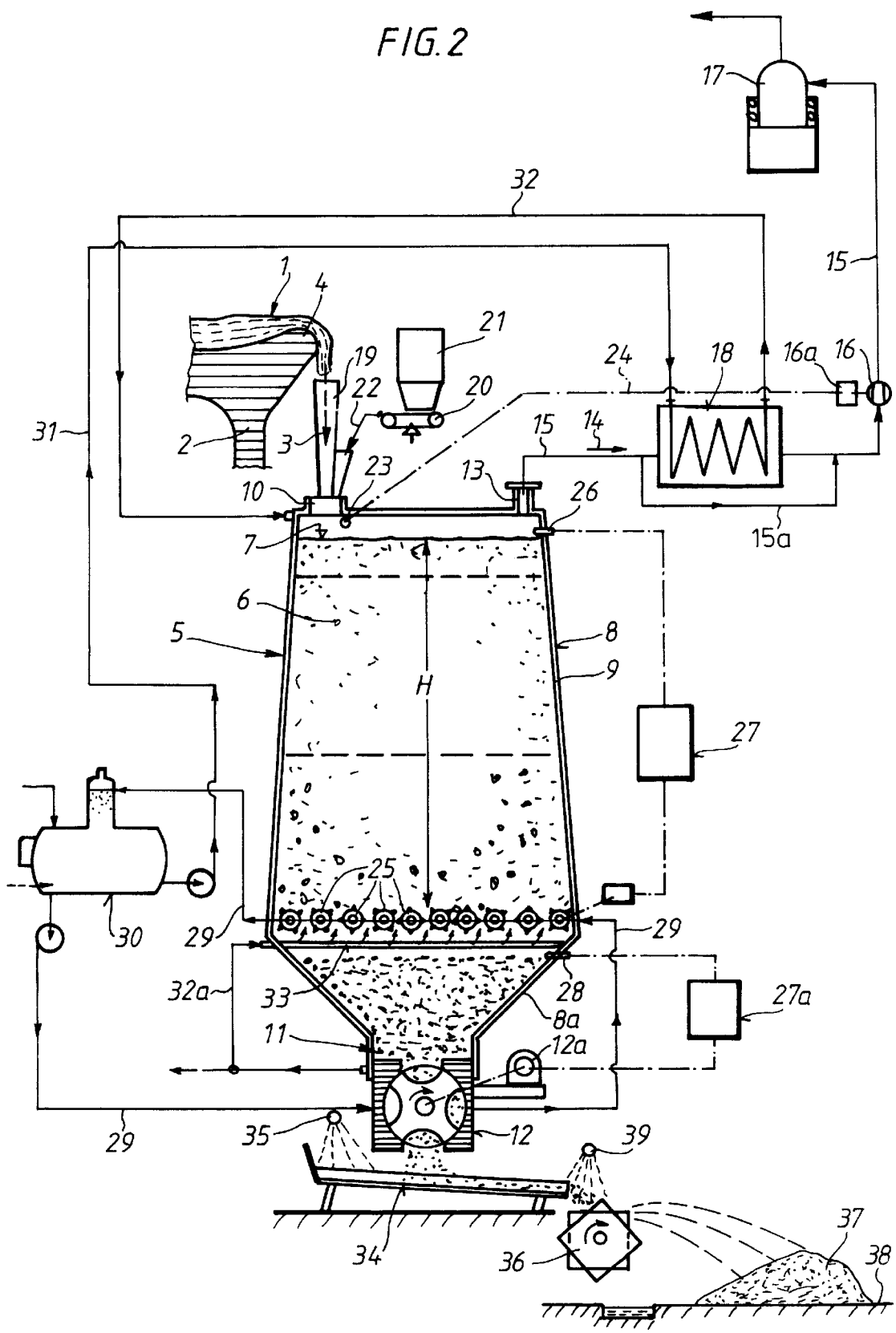
FIG. 2 shows a diagrammatic view of an embodiment of the apparatus according to the invention, with representations of essential parts of the reactor and of the accessories.

The more detailed construction of the cooling device according to the invention is revealed by the following description of the embodiment which is illustrated with the aid of FIG. 2, in which the same reference numerals are used for the same apparatus parts as in FIG. 1, so that these apparatus parts do not have to be explained in detail again.

The interior of the reactor 5 is almost completely filled with the slag/coal mixture in the form of a material column 6 which extends approximately over a height H, and the predetermined filling height (filling level 7) should be set and maintained in a controllable manner.

In FIG. 2 it can be seen that the substantially closed housing 8 is formed both in its casing portion and also at its upper and lower end portions by double walls 9 so that the housing 8 overall, i.e. including the inlet 10, solids outlet 11 and gas outlet 13, can be sufficiently cooled by a suitable cooling medium, particularly water or water vapour (as will be explained further below). In this connection it should be mentioned that the inner faces of the housing walls (double walls 9) can also be provided at least in the hottest upper housing portions with a refractory lining, particularly a refractory lining made from refractory bricks, which can be attached or fixed on the inner faces of the double walls 9 in a manner which is known per se in order to form an additional protection against overheating. This can be a relatively thin brick lining (by comparison with known metallurgical furnaces).

The gas outlet 13 is connected by way of a gas conveying pipe 15 and an extractor and conveyor fan 16 to a gas collecting tank 17 which is preferably constructed in the manner of a gasometer. A heat exchanger 18, which is provided for the generation of saturated steam and of which the function will be discussed in greater detail below, is connected into the gas conveying pipe 15 before the extractor and conveyor fan 16 in the direction of conveying the gas (according to the arrow 14). As indicated at 15a, it is also possible to circumvent the heat exchanger 18 with the aid of a bypass pipe which becomes relevant when—as is likewise possible but not illustrated in greater detail—the generated fuel gas or water gas is delivered directly to a use where no cooling is necessary, such as for example in the case of direct return to a blast furnace for use as reducing gas. The principal use of the heat exchanger 18 is to cool the fuel gas or water gas, although at the same time the necessary steam is generated which is required in the reactor.

The reactor inlet 10 is connected on the one hand to an approximately chute-like feed arrangement 19 for the redhot molten blast furnace slag (arrow 3) and on the other hand to a controllable coal proportioning arrangement 20 which is constructed for proportioning by weight and in this case is preferably constructed approximately in the form of a proportioning belt scale or the like and is advantageously disposed below a coal storage bin 21.

With the aid of this coal proportioning arrangement 20 the coal can be delivered to the blast furnace slag 3 at the reactor inlet 10 in such a weight ratio that during gasification of the coal the slag is cooled, depending upon its enthalpy, from a starting temperature (approximately up to 1450° to 1500° C.) to a temperature of approximately 900° C. within the reactor 5.

In the region of the reactor inlet 10 there is also disposed a gas pressure monitoring device 23 which is coupled (as indicated by a dash-dot control line 24) to a drive (drive motor) 16a of the extractor and conveyor fan 16 in such a way that by control of the fan speed a zero gas pressure can be set and maintained at the reactor inlet 10. Thus by control of the quantity of fuel gas drawn off from the reactor 5 to the gas collecting tank 17 the zero gas pressure can be controlled so that penetration of outside air or oxygen through the inlet 10 into the interior of the reactor 5 is largely or completely avoided. As has already been mentioned above, in this way a slight supply of steam can compensate for a slight pressure change in the region of the inlet 10 (as an additional measure for preventing the penetration of external air into the reactor 5).

In the illustrated embodiment the lower outlet region of the reactor housing 8 is constructed in the form of an outlet hopper 8a, the outlet opening of which forms the solids outlet 11 of the reactor 5 or of the housing 8. The outlet arrangement is built onto this solids outlet 11 in the form of a rotatable gas-tight discharge gate 12 which is known per se and can be cooled by way of cavities and can be formed in a manner which is known per se for example by a bucket wheel (as shown in FIG. 2) or by a double-flap gate or the like.

In any case this discharge gate 12 should be controllable in the throughput quantity. For this reason in the embodiment according to FIG. 2 the discharge gate 12 has coupled to it a correspondingly constructed drive motor 12a which is variable in its speed and thus controllable in order to be able to control the quantity of solids discharged from the reactor 5.

Furthermore, approximately in the region of the upper end of the outlet hopper 8a which is widened in cross-section there is disposed a group of water-cooled rotatable crushing rolls 25 which are controllable in speed and which essentially form a lower closure of the treatment zone in the interior of the reactor 5 and accordingly bear or support the material column 6 of slag/coal mixture. As it passes through these crushing rolls 25, which are arranged adjacent to one another equal distances apart, the ready-treated quantity of solids consisting of cooled blast furnace slag and coal ash produced during the coal gasification is sufficiently crushed. This crushed slag/ash mixture is then delivered by way of the outlet hopper 8a to the discharge gate 12, by which it can be completely extracted from the reactor 5 in a controllable manner.

Furthermore, at the upper end of the reactor 5 a filling level measuring sensor device 26 which can be constructed for example in the form of an ultrasonic device and is intended for controlling this filing height (filling level) 7 is mounted at the filling height 7. This first filling level monitoring device 26 is connected to a control arrangement 27 by which the speed of the crushing rolls 25 is controlled in such a way that the material column 6, that is to say the filling in the reactor, is always kept at least at the filling level 7.

Moreover, in the outlet hopper 8a in the region just below the crushing rolls 25 there is disposed a second filling level sensor or measuring device 28, which can likewise be constructed in the form of an ultrasonic device and is connected to a separate control arrangement 27a in such a way that the speed of the discharge gate 12 can be controlled by way of its drive motor 12a. This latter occurs in that a maximum material filling level in the outlet hopper 8a is always monitored and maintained by way of the second filling level measuring device 28, as a result of which between this maximum material filling level and the underside of the crushing rolls 25 a relatively empty or free space—apart from the crushing solid material falling down—is produced in which is disposed the steam injector nozzle arrangement 33 already explained in relation to FIG. 1.

The cavities of the discharge gate 12 and the hollow interior of the crushing rolls 25 are advantageously connected by way of cooling water pipes 29 to a water tank 30 containing demineralised water, and preferably—as illustrated in the drawings—at least partially or completely in the form of a circulating pipe or circulating connection. By means of this cooling water circulation the discharge gate 12 and the crushing rolls 25 can be sufficiently cooled and at the same time preheated water is produced. The latter then offers an advantage above all if the heat exchanger 18 is connected by a water pipe 31 to the water tank 30 so that water which is already preheated can be delivered to the heat exchanger 18. From this, saturated or superheated steam is generated in the heat exchanger 18 by an indirect heat exchange with the produced fuel gas or water gas (arrow 14) and is introduced by way of a steam pipe 32 into the double walls 9 of the reactor housing 8, as can be seen in FIG. 2. The saturated steam flows from the top downwards between the double walls 9 of the reactor housing 8, resulting in an indirect heat exchange with the material located inside the reactor 5, so that the double walls 9 are cooled and at the same time the saturated steam is superheated on its passage downwards inside the double walls 9. This superheated steam is drawn off out of the double walls 9 at the lower end, i.e. in the region of the solids outlet 11, and delivered by way of a steam pipe 32a to the nozzle arrangement 33 (any excess can be led off from the steam pipe 32a—as indicated by the broken arrow—for other possible uses. The superheated steam is injected by the nozzle arrangement 33 (within the relatively empty or free space below the crushing rolls 25) from below into the material column 6 of the slag/coal mixture so that it is distributed uniformly over the entire cross-section, so that—when further superheated by contact with the mixture—the steam flows through the material column 6 upwards from below in order as a result to bring about or support the generation of fuel gas or water gas (as has already been explained in greater detail above).

The slag/ash mixture which is crushed into grain or sand form, particularly into a type of granulated blast furnace slag, is drawn off in a controllable manner at the lower solids outlet 11 with the aid of the gas-tight discharge gate 12. In this case it may also be advantageous if—as illustrated in the drawing of the embodiment—the slag/ash mixture drawn off from the solids outlet 11 of the reactor is cooled still further at least by spraying on of water.

For this purpose—as illustrated in FIG. 2—first of all a mechanical conveyor arrangement 34 can be provided below the discharge gate 12, this conveyor arrangement being formed for example by a simple chute or by a vibrating chute and above which is disposed a first cooling water spray arrangement 35 which sprays both this mechanical conveyor arrangement 34 and the extracted slag/ash mixture with water and further cooled thereby.

Furthermore, following the mechanical conveyor arrangement 34 a type of rotating throw-off drum 36 can be provided which throws off the cooled slag/ash mixture approximately in the form of a heap 37 onto a storage area 38 or the like. In this case a second cooling water spray arrangement 39 is also provided at least in the region above the throw-off drum 36 and further cools the slag/ash mixture to be removed.

As can be readily perceived from the preceding description of the illustrated embodiment, this cooling device according to the invention is particularly well suited for the method of continuous cooling of red-hot molten blast furnace slag which is explained in greater detail above.

I claim:

1. A method of solidifying red-hot molten blast furnace slag and generating fuel gas, said method comprising:
    a. delivering to a reactor a mixture of said slag and fuel containing at least some coal;
    b. injecting steam into said reactor;
    c. gasifying said coal by the heat of said slag in the presence of said steam to form a fuel gas and solidify said slag; and
    d. discharging solidified slag and said fuel gas separately from said reactor.

2. The method according to claim 1 wherein said coal is crushed.

3. The method according to claim 1 wherein said fuel also includes a liquid fuel.

4. The method according to claim 1 wherein said coal has a grain size of between about 5–10 mm.

5. The method according to claim 1 including maintaining the mixture in said reactor at a selected height.

6. The method according to claim 1 including adjusting the rate of discharge of said slag from said reactor to correspond substantially to the rate of delivery of said mixture to said reactor, thereby maintaining a substantially uniform height of said mixture in said reactor.

7. The method according to claim 6 including passing said slag through said reactor vertically downward.

8. The method according to claim 1 including maintaining a substantially zero gas pressure in said reactor.

9. The method according to claim 8 wherein said substantially zero gas pressure is maintained by regulating the rate of discharge of said fuel gas from said reactor.

10. The method according to claim 1 including passing the fuel gas discharged from said reactor through a heat exchanger to extract heat from said fuel gas.

11. The method according to claim 10 including using heat extracted from such fuel gas to generate said steam.

12. The method according to claim 1 wherein said steam is injected into said reactor from below said mixture.

13. The method according to claim 1 wherein the steam injected into said reactor is generated from demineralized water.

14. The method according to claim 13 including preheating said demineralized water prior to generating said steam by passing said water through said reactor adjacent its lower end.

15. The method according to claim 1 including spraying cooling water on said slag discharged from said reactor.

16. The method according to claim 1 wherein said fuel gas contains essentially $H_2$ and CO.

17. Apparatus for solidifying red-hot molten blast furnace slag and generating fuel gas comprising:
   a. a reactor having an upper end and a lower end provided with an outlet;
   b. means for delivering into the upper end of said reactor a mixture of said slag and a fuel containing at least some coal, the heat of said slag being sufficient to gasify said coal;
   c. means for injecting steam into said reactor at a temperature sufficiently lower than that of said slag to solidify said slag and react with gas from said gasified coal and produce a fuel gas;
   d. means for discharging solidified slag from said reactor; and
   e. means for discharging fuel gas from said reactor separately from said solidified slag.

18. Apparatus according to claim 17 including crushing means for crushing solidified slag.

19. Apparatus according to claim 18 including means for cooling said crushing means.

20. Apparatus according to claim 17 wherein said crushing means comprises a plurality of rotatable rolls and means for rotating said rolls.

21. Apparatus according to claim 20 including variable speed drive means for adjusting the rate of rotation of said rolls.

22. Apparatus according to claim 21 wherein said variable speed drive means is operable to maintain a substantially uniform height of said slag and said fuel in said reactor.

23. Apparatus according to claim 22 including level sensor means for sensing the height of said slag and said fuel in said reactor, said sensor means being coupled to said variable speed drive means for controlling the rate of rotation of said rolls.

24. Apparatus according to claim 20 wherein said rolls are hollow and including means for passing a cooling fluid through said rolls.

25. Apparatus according to claim 17 wherein said means for discharging solidified slag from said reactor comprises a movable discharge gate and control means for controlling the quantity of said solidified slag which passes said discharge gate.

26. Apparatus according to claim 25 including sensor means for sensing the quantity of said solidified slag at a level above that of said discharge gate, said sensor means being coupled to said discharge gate for adjusting the rate of movement of said gate.

27. Apparatus according to claim 17 including heat exchange means for receiving and extracting heat from fuel gas discharged from said reactor.

28. Apparatus according to claim 27 including water supply means, means for passing water from said water supply means through said heat exchange means to produce said steam, and means for delivering said steam to said steam injecting means.

29. Apparatus according to claim 28 wherein said reactor includes a housing having walls spaced from one another, the space between said walls constituting part of the means for delivering said steam to said steam injecting means.

30. Apparatus according to claim 17 including means for controlling the discharge of fuel gas from said reactor to maintain substantially zero gas pressure at said inlet.

31. Apparatus according to claim 17 including means for spraying cooling fluid on solidified slag discharged from said reactor.

32. A method of solidifying red-hot molten blast furnace slag and generating fuel gas, said method comprising:
   a. delivering to a reactor a mixture of said slag and fuel containing at least some coal;
   b. gasifying said coal by the heat of said slag to form a fuel gas and thereby solidify said slag; and
   c. discharging solidified slag and said fuel gas separately from said reactor.

33. Apparatus for solidifying red-hot molten blast furnace slag and generating fuel gas comprising:
   a. an upright reactor having an upper end and a lower end provided with an outlet;
   b. means for delivering into the upper end of said reactor a mixture of said slag and a fuel containing at least some coal, the heat of said slag being sufficient to gasify said coal and produce a fuel gas and thereby cool and solidify said slag;
   c. means for discharging solidified slag from said reactor; and
   d. means for discharging fuel gas from said reactor separately from said solidified slag.

* * * * *

UNITED STATES PATENT AND TRADEMARK OFFICE
CERTIFICATE OF CORRECTION

PATENT NO. : 5,820,814
DATED : October 13, 1998
INVENTOR(S) : Joseph E. Doumet

It is certified that error appears in the above-indentified patent and that said Letters Patent is hereby corrected as shown below:

On the title page item [57] should read:

-- ABSTRACT

A mixture of red-hot molten blast furnace slag and fuel containing at least some coal is treated in a reactor with steam to cool the slag and gasify the coal to produce a fuel gas. The slag is crushed and discharged from the bottom of the reactor and the fuel gas is discharged from the upper end of the reactor. Heat from the fuel gas may be used to generate the steam. --

Signed and Sealed this

Second Day of February, 1999

Attest:

Attesting Officer

*Acting Commissioner of Patents and Trademarks*